April 19, 1938. H. H. HARR Re. 20,702

METHOD OF AND APPARATUS FOR DISPENSING BEVERAGES

Original Filed May 3, 1934 2 Sheets-Sheet 1

INVENTOR
Herman H. Harr,
BY
Harry B. Rook,
ATTORNEY

April 19, 1938. H. H. HARR Re. 20,702
METHOD OF AND APPARATUS FOR DISPENSING BEVERAGES
Original Filed May 3, 1934 2 Sheets-Sheet 2
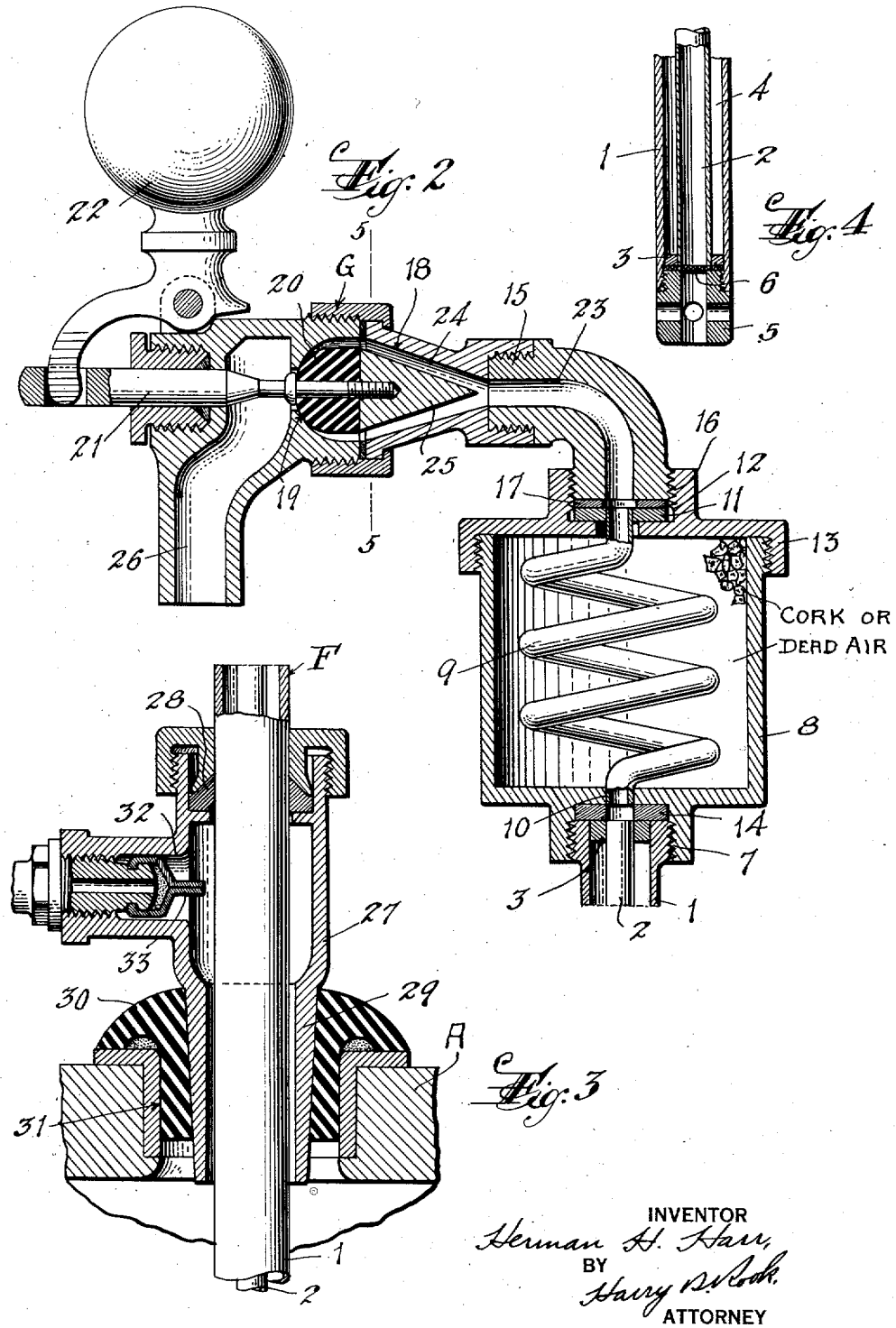
INVENTOR
Herman H. Harr,
BY
Harry B. Cook.
ATTORNEY Reissued Apr. 19, 1938

Re. 20,702

UNITED STATES PATENT OFFICE 20,702

METHOD OF AND APPARATUS FOR DISPENSING BEVERAGES

Herman H. Harr, Newark, N. J.

Original No. 2,021,305, dated November 19, 1935, Serial No. 723,755, May 3, 1934. Application for reissue October 18, 1937, Serial No. 169,702

12 Claims. (Cl. 225—1)

Certain beverages, for example beer and carbonated beverages, contain activating gases which it is desirable to retain in the beverages until they are consumed, since the absence of these activating gases causes the beverage to become "flat" or unpalatable.

It is desirable in many instances, to dispense such beverages, particularly beer, directly from the barrel or other container in which the beer is packed for transportation, and it is of course possible to withdraw at least some of the beverage from the container under the pressure of the gas contained in the beverage. However, when this is done, the gases are quickly dissipated and the beverage becomes unpalatable. It has also been a practice to inject gas such as air under pressure into the barrel or container above the beverage and to force the beverage from the container under such gas pressure. However, where this has been attempted with known apparatus, the gases frequently are subjected to conditions that create such a high pressure that the beverage cannot be deposited in a glass or other receptacle without considerable agitation, splashing and loss of beverage by overflow from the glass, and furthermore, excessive foaming of the beverage occurs and the activating gases in the beverage are lost.

One object of my invention is to provide a novel and improved method of and apparatus for dispensing or drawing beer, carbonated beverages, or the like, directly from the barrel or other container through a relatively short passage to be discharged into a glass or other receptacle under conditions subjecting the beverage in the container to pressures sufficiently high to hold the activating gases contained therein in solution at the temperatures at which the beverage in the barrel is being kept or dispensed so as to prevent effervescence and resulting dissipation of said activating gases without inducing, as a result of the use of beverage calming pressures of the magnitude required, material agitation of the beverage, splashing thereof into the glass or other receptacle or excessive foaming of the beverage as it is discharged into the receptacle.

Other objects, advantages and results of the invention will appear from the following description and the accompanying drawings:

In said drawings where corresponding and like parts are designated throughout the several views by the same reference characters, Figure 1 is a side elevation of a beverage dispensing apparatus embodying my invention, showing the same in combination with a barrel which is shown partially in vertical section.

Figure 2 is an enlarged vertical longitudinal sectional view through the outlet end of the dispensing apparatus.

Figure 3 is a similar view of a portion of the dispensing apparatus which is directly connected to the container.

Figure 4 is a similar view of the lower end of the draft pipe of the dispensing apparatus, that is, the end thereof which is located within the container.

Figure 1:
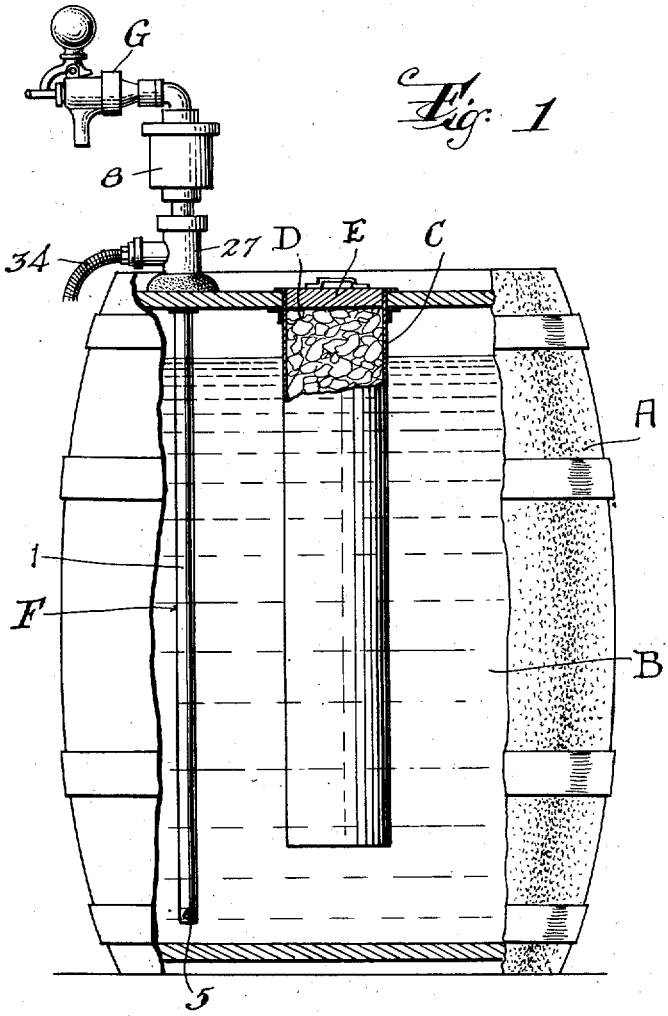
Figure 5:
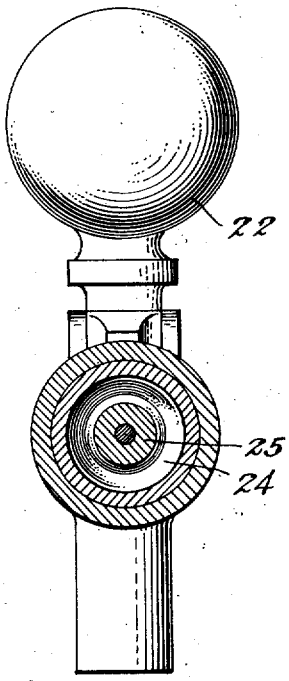
Figure 5 is a sectional view on the line 5—5 of Figure 2.

In general, the invention contemplates maintaining the beer in calm liquid state by maintaining gas pressure on the beer in the container greater than that of the activating gases, and drawing the beer directly from the calm body of liquid in the container through a restricted passage which leads from a point adjacent the bottom of the container to the valve seat of a discharge faucet, said passage being formed to substantially reduce the pressure as the beer flows through said passage and maintain a small volume of flow per unit of length of the passage sufficiently uniform to prevent abrupt or excessive changes in velocity liable to cause agitation and sudden expansion of the beer, whereby the beer is kept in substantially calm liquid condition to the discharge point, the activating gases are substantially retained in the beer and the beer may be dispensed into a glass without material splashing and without excess foaming.

Specifically describing the illustrated embodiment of the invention the reference character A designates a barrel which has therein a beverage B containing activating gases. The beverage within the container is refrigerated in any suitable manner; in the present instance a container C is inserted through one head of the barrel and may receive cracked ice or other suitable refrigerant D, the container being closed by a removable cover E. Obviously any other suitable refrigerating means may be provided.

Inserted through one head of the barrel is a dispensing apparatus which includes a draft section or element F inserted into the barrel with one end projecting therefrom and having connected thereto a discharge faucet G. The draft element includes a length of pipe 1 within which is mounted a section of thin walled tubing 2 of considerably smaller diameter than the pipe, the tubing being secured in the pipe by bushings 3 so as to form a dead air space 4 between the tube and the pipe. In the lower end of the pipe 1 is fitted a strainer head 5 between which and the end of the tube 2 is a screen 6 to prevent the passage of particles of pitch or other foreign matter into the tube. The other end of the pipe is connected at 7 to a casing 8 within which is arranged a helical coil of tubing 9 which is approximately of the same cross sectional area as tube 2, one end of said coil communicating at 10 with one end of the tube 2 and the other end of the coil being connected to a washer 11 which is arranged in the base of a recess 12 in a removable cover 13 for the casing. A packing washer 14 is interposed between the end of the tube 2 and the casing 8 to provide a liquid tight joint between the tube 2 and the coil 9. The outlet end of the coil 9 communicates with a spigot or faucet 15 which is screw threaded at 16 into the cover 13 of the casing. A packing washer 17 is interposed between the end of the spigot and the washer 11 on the coil to provide a liquid tight connection. The faucet has a passage 18 therethrough in which is arranged a valve seat 19 with which co-operates a valve head 20 mounted on a slidable stem 21 which is reciprocated by a hand lever 22 for opening and closing the valve. The inlet end 23 of the passage 18 is preferably of the same cross-sectional area as the inside of the tube 2 and the tube of the coil 9, and said passage has a frusto-conical portion 24 which gradually increases in diameter inwardly of the faucet or toward the outlet end thereof. The valve head 20 has a frusto-conical extension 25 in the corresponding shaped portion 24 of the valve passage so that the cross sectional area of the portion 24 of the passage is approximately the same as the cross-sectional area of the portion 23 of the passage With this construction, the passage through the draft pipe is of approximately the same cross-sectional area throughout its length to the valve seat so as to prevent undesirable variations in the velocity of flow and provides a restricted outlet for the beverage, whereby the pressure of the beer is reduced during flow from the container to the valve seat and the coil 9 provides further resistance or restriction to the flow of the beverage through the draft passage when it is desired to maintain higher pressures on the beer. Due to the uniform cross-sectional area of the passage, no material expansion of the beverage can occur between the inlet end of the draft pipe and the valve seat 19, such as would cause foaming, and only a small stream of beverage can be discharged through the spigot so as to prevent splashing, and this is true even if the pressure in the barrel becomes high because of expansion of the gases in the barrel, as the result of increased temperature. Moreover, only a small quantity of beverage may accumulate in the faucet and passage thereto to become warm so that there is no waste of beverage as is entailed in drawing off warm agitated beverage. When the valve is open slight expansion of the beverage may take place in the outlet portion 26 of the valve so as to provide a limited amount of foam on the beverage which is dispensed into a glass or the like. Furthermore, the structure results in small bubbles or a "creamy-drink" instead of large foamy bubbles. The passage in effect has a constricted portion extending to the valve seat, and this passage is of uniform volume per unit of length so that the pressure is substantially reduced and the flow is reduced and maintained uniform. The frusto-conical extension 25 on the valve gently guides the beverage through the passage to reduce agitation or surging of the beverage, and probably also provides frictional resistance to flow of the beverage.

For connecting the draft element F to the barrel I have shown a tubular fitting such as a sleeve 27 loosely slidable upon the pipe 1 and having a packed connection 28 with the pipe at one end and its other end 29 formed to pass through a bushing gasket 30 in the bung hole 31 of the barrel. The sleeve 27 has a lateral passage 32 in which is an outwardly closing rubber check valve 33 of known construction and to which may be connected through a hose 34, any suitable source of gas under pressure. The gas may flow inwardly through the valve 33 and between the sleeve 27 and the pipe 1 into the barrel on top of the beverage therein, so as to form a blanket of inert gas over the beverage and thereby prevent liberation of the activating gases into the empty space in the barrel. The total pressure of the gases acting on the surface of the beer should exceed that necessary to keep the activating gases of the volume or amount usually present in the beer for rendering the same sufficiently palatable in solution at the temperature maintained. Pressures greater than the minimum required may be advantageously employed to increase the solubility of the gases, i. e., to control the saturation point, and thereby rendering the carbonated beer more stable during flow. For example, gauge pressures as high as fifteen pounds per square inch or more may be employed, depending on the temperature, to maintain the beer in a calm liquid condition.

The pressures employed in my invention for stabilizing the beer are greater than those required to normally lift or force the beverage through a vertical distance corresponding to the short length of passage employed. In order to oppose the flow inducing action of the gas pressure or head, I provide a passage having a reduction or constriction substantially continuously from the lower end thereof to the discharge point or valve seat of an order co-ordinated with the length of the short passage offering a resistance to flow or a throttling action substantially uniformly distributed to maintain under the applied pressures, when the faucet is opened, a velocity of flow within a range preventing undesirable agitation of the beer.

I have found that for the most satisfactory operation of the apparatus, the inside diameter of the draft passage through the tube 2, coil 9 and faucet up to the valve seat of the faucet, should be approximately $\frac{3}{16}$ths of an inch or the passage should have a cross-sectional area of approximately .027 of a square inch.

In operation of the apparatus, the pressure of the gas forces the beverage upwardly through the draft pipe to the valve seat 19, and when the valve is open, the beverage will be dispensed through the outlet 26 of the valve. This operation takes place without any splashing of the beverage into the glass, without dissipating the gases in the beverage, and without excessive foaming of the beverage in the glass.

The dead air space 4 between the pipe 1 and the tube 2 will insulate the beverage in the tube above the level of the beverage in the barrel so as to keep the beverage in the tube cold, while the space between the coil 9 and casing 8 may also be a dead air space or filled with suitable insulating material such as cork, for maintaining cold the beverage in the coil.

In my invention the pipe 1 is of an external diameter adapted for and fitting the sleeve 27 and serving as a protective enclosure for the smaller thin walled tube 2, the two pipes 1 and 2 preferably being coextensive in length, and forming the rigid draft element F capable of being readily forced through the sleeve 27 into the barrel. The passage 2—9 which is relatively short and of a small cross-section so that the volumetric capacity thereof does not exceed several cubic inches, has a correspondingly low heat transfer rate and is therefore more effectively insulated by the enclosing means therefor above described both within and beyond the barrel.

While I have shown and described the invention as embodied in certain details of construction it should be understood that this is primarily for illustrating the principles of the invention and that many modifications and changes may be made in the details of structure without departing from the spirit or scope of the invention.

Having thus described my invention, what I claim is:

1. A dispensing apparatus for drawing beverages containing activating gases from a barrel or container, comprising a draft pipe including a section to be inserted into a container with one end projecting therefrom, said section including a pipe and a smaller thin walled tube mounted in said pipe in spaced relation thereto to provide a dead air space therebetween, a casing secured to the outer end of said pipe, a coil of tubing within said casing in spaced relation to the walls thereof and communicating at one end with said tube in said pipe, a faucet mounted on said casing and communicating with the other end of said coil, a sleeve loosely surrounding said pipe having a slidable packed connection at one end therewith and formed at its other end to be fitted into an opening in said container, said sleeve having a lateral passage with an outwardly closing check valve therein for connection to a supply of gas under pressure to supply such gas to said container.

2. The combination with a container for beverages having activating gases therein, of means for refrigerating the beverage in the container, a draft pipe including a section to be inserted into a container with one end projecting therefrom, said section including a pipe and a smaller thin walled tube mounted in said pipe in spaced relation thereto to provide a dead air space therebetween, a casing secured to the outer end of said pipe, a coil of tubing within said casing in spaced relation to the walls thereof and communicating at one end with said tube in said pipe, a faucet mounted on said casing and communicating with the other end of said coil, a sleeve loosely surrounding said pipe having a slidable packed connection at one end therewith and formed at its other end to be fitted into an opening in said container, said sleeve having a lateral passage with an outwardly closing checkvalve therein for connection to a supply of gas under pressure to supply such gas to said container.

3. The combination with a container for beverages having activating gases therein, of means for refrigerating the beverage in the container, a draft pipe including a section to be inserted into a container with one end projecting therefrom, said section including a pipe and a smaller thin walled tube mounted in said pipe in spaced relation thereto to provide a dead air space therebetween, a casing secured to the outer end of said pipe, a coil of tubing within said casing in spaced relation to the walls thereof and communicating at one end with said tube in said pipe, a faucet mounted on said casing and communicating with the other end of said coil, a sleeve loosely surrounding said pipe having a slidable packed connection at one end therewith and formed at its other end to be fitted into an opening in said container, said sleeve having a lateral passage with an outwardly closing checkvalve therein for connection to a supply of gas under pressure to supply such gas to said container, said tube and the tubing of the coil having an inside diameter of approximately three-sixteenths of an inch.

4. Apparatus for dispensing beer comprising a container, means associated with the container for cooling the beer, means for maintaining gas pressure on the beer in said container to keep the activating gases in solution to the extent required for maintaining the palatable quality of the beer at the temperature maintained and the beer in calm liquid state, a faucet, and means providing a relatively short passage for the beer leading from a point adjacent the bottom of said container and being connected at a point contiguous to the container to said faucet, said passage having a uniform small cross-sectional area from within said container continuously substantially to the valve seat of the faucet of an order co-ordinate with the length of the passage so that the pressure in the passage is reduced to an extent attaining a velocity of discharge preventing the undesirable formation of foam, and a small and substantially uniform volume of flow is produced through the passage, said passage having a volumetric capacity not exceeding several cubic inches.

5. Apparatus for dispensing beer from a container, means associated with the container for cooling the beer, means for maintaining gas pressure on the beer in the container to keep the activating gases in solution to the extent required for maintaining the palatable quality of the beer at the temperature maintained and the beer in calm condition, and a short draft means inserted into said container having a faucet at the outer end thereof contiguous to the container, said draft means including a passage having a small cross-sectional area from a point within the container continuously substantially to the valve seat of said faucet and forming a substantially uniformly distributed throttling means, and said cross-sectional area being of an order co-ordinate with the length of the passage so that it opposes the pressure sufficiently to attain a velocity of discharge within a range preventing the undesirable formation of foam and produces a correspondingly small volume of flow continuously throughout said throttling means, said passage having a volumetric capacity not exceeding several cubic inches.

6. Apparatus for dispensing a gas activated beverage such as beer, comprising a container, means for cooling the beverage at the container, valvular means for maintaining gas pressure on the beverage in said container to keep the activating gases in solution to the extent required to maintain the palatable quality of the beverage at the temperature maintained and the beverage in a calm state, said pressure exceeding that required to normally lift the beverage to the point of discharge, and a short draft means having a faucet at the outer end thereof contiguous to the container and providing a passage for the beverage extending from a point adjacent to the bottom of the container to the discharge point, said passage having a small cross-sectional area extending from a point within the container continuously substantially to the discharge point of an order co-ordinate with the length of the passage so that it opposes the gas pressure sufficiently to attain a velocity of discharge within a range preventing the undesirable formation of foam and produces a correspondingly small volume of flow continuously throughout the passage, and said short passage having a volumetric capacity not exceeding several cubic inches.

7. Apparatus for dispensing beverages such as beer, comprising a container, means for cooling the container, a tubular fitting adapted to be inserted in an opening in said container having means for maintaining gas pressure on the beverage to keep the activating gases in solution to the extent required to maintain the palatable quality of the beverage at the temperature maintained and the beverage in a calm liquid state, a short draft means passing through said fitting and having a faucet at the outer end thereof contiguous to the container, said draft means providing a passage for the beverage leading from a point adjacent the bottom of the container and having a small cross-sectional area from within the container continuously to said faucet forming a substantially uniformly distributed throttling means, and said cross-sectional area being of an order co-ordinate with the length of the passage so that it opposes the pressure sufficiently to attain a velocity of discharge within a range preventing the undesirable formation of foam and produces a correspondingly small volume of flow throughout the passage, said passage having a volumetric capacity not exceeding several cubic inches, and means disposed about said passage forming a reinforcing enclosure therefor and serving to insulate the same, the portion of said last named means passing through said fitting being adapted in size thereto to provide a fluid tight connection therebetween.

8. A dispensing apparatus for drawing beverages such as beer containing activating gases from a barrel or container comprising a tubular fitting for insertion in an opening in said container having valve controlled means for the admission of a gas under pressure to the container, said means maintaining gas pressure on the beer in the container to keep the activating gases in solution to the extent required for maintaining the palatable quality of the beer at the temperature thereof and the beer in calm liquid state, and a short draft means having a faucet at the outer end thereof contiguous to the container and providing a passage for the beer leading from a point adjacent the bottom of said container to the valve seat of the faucet, said draft means comprising an element extending through said fitting in fluid tight relation thereto into the container towards the lower end thereof and including an outer tube of an external diameter adapted to said fitting and a smaller passage forming tube mounted in said outer tube in spaced relation thereto to provide a dead air space therebetween, and said passage having a uniform small cross-sectional area extending to the valve seat of the faucet of an order co-ordinate with the length of the passage so that it substantially reduces the pressure therein and produces small and substantially uniform volume of flow therethrough, and said passage having a volumetric capacity not exceeding several cubic inches.

9. The method of dispensing beer from a container, consisting in cooling the beer at the container, maintaining gas pressure on the beer in the container to keep the activating gases in solution to the extent required for maintaining the palatable quality of the beer at the temperature maintained, and the beer in calm liquid condition, and drawing the beer under said pressure and at the temperature thereof maintained at the container from a point adjacent to the bottom of the container through a relatively short passage to a discharge point contiguous to the container without undesirable change in the temperature of the beer while frictionally resisting the flow substantially uniformly from within the container continuously substantially to the discharge point sufficiently to maintain a correspondingly small volume of flow through the passage and obtain a velocity of discharge preventing the undesirable formation of foam, and while maintaining the volumetric capacity of the passage within a range not exceeding several cubic inches.

10. The method of dispensing beer from a container, consisting in cooling the beer at the container, maintaining gas pressure on the beer in the container to keep the activating gases in solution to the extent required for maintaining the palatable quality of the beer at the temperature maintained, and the beer in calm liquid condition, and drawing the beer under said pressure and at the temperature thereof maintained at the container from a point adjacent to the bottom of the container through a relatively short passage to a discharge point contiguous to the container under conditions insulating the beer against the access of heat thereto while subjecting the flow to a throttling action distributed uniformly along the passage from within the container continuously substantially to the discharge point of an order maintaining a correspondingly small volume of flow through the passage and attaining a velocity of discharge preventing the undesirable formation of foam, and while maintaining the volumetric capacity of the passage within a range not exceeding several cubic inches.

11. The combination with a container for beer, and means for cooling the beer in the container, of means for maintaining gas pressure on the beer in the container to keep the activating gases in solution to the extent required for maintaining the palatable quality of the beer at the temperature maintained, and the beer in calm liquid condition, and a relatively short draft element extending through said container from a point adjacent to the bottom thereof to a discharge point contiguous to said container and having a faucet at the discharge end thereof, said element having a draft passage therethrough of small cross-sectional area from a point within the container continuously substantially to the discharge point of an order co-ordinate with the length of the passage so that it frictionally resists the flow uniformly through the passage sufficiently to maintain a correspondingly small volume of flow through the passage and attain a velocity of discharge preventing the undesirable formation of foam, and said short passage having a volumetric capacity not exceeding several cubic inches.

12. The combination with a container for beverages containing activating gases, and means for cooling the container, of a tubular fitting for insertion in an opening in the container having valve controlled means for the admission of gas under pressure to the container for keeping the activating gases in solution to the extent required for maintaining the palatable quality of the beverage at the temperature maintained, and a short draft means having a faucet at the outer end thereof contiguous to the container and providing a passage for the beverage leading from the lower portion of the container to the faucet, said draft means comprising an element extending through said fitting into the container and including an outer tube of an external diameter adapted to said fitting and a smaller passage forming tube mounted in said outer tube in spaced relation thereto to provide an insulating space therebetween, said passage having a small cross-sectional area from within the container continuously to the faucet of an order co-ordinate with the length of the passage so that it maintains a correspondingly small volume of flow and attains a velocity of discharge preventing the undesirable formation of foam, and said short passage having a volumetric capacity not exceeding several cubic inches.

HERMAN H. HARR.